United States Patent Office 3,044,963
Patented July 17, 1962

3,044,963
PROCESS FOR THE REGENERATION OF AROMATIZATION CATALYSTS
Russell G. Hay, Gibsonia, and Charles W. Montgomery, Oakmont, Pa., assignors to Gulf Research & Development Company, Pittsburgh, Pa., a corporation of Delaware
No Drawing. Filed Oct. 19, 1959, Ser. No. 847,099
7 Claims. (Cl. 252—412)

This invention relates to a process for the regeneration of catalysts.

The chromates or dichromates of sodium or potassium impregnated upon a suitable support such as, for example, alumina or alumina stabilized with a small amount of silica are useful as catalysts for the aromatization of normal and branched paraffins and olefins having at least 6 carbon atoms available for aromatization. These catalysts are improved when the concentration of sodium or potassium in the catalyst is higher than the stoichiometric equivalent of the chromate or dichromate. Accordingly, such catalysts are improved by impregnating them with the hydroxide of sodium or potassium. Treatment of the catalyst with solutions of sodium or potassium hydroxides can be accomplished simultaneously with the impregnation with the chromate or dichromate by the addition of sodium or potassium hydroxide to the chromate or dichromate solution. The sodium or potassium hydroxide can also be added to the catalyst subsequent to impregnation with the chromate or dichromate solution whereby the amount of sodium or potassium metal hydroxide introduced into the composite may be controlled completely independently of the composition of the chromate or dichromate.

When the sodium or potassium chromate or dichromate on alumina catalysts are employed for the aromatization of non-aromatic hydrocarbons they tend to become progressively deactivated with increasing hydrocarbon throughput. Such catalysts can be partially reactivated by passing air over them at a temperature of 900°–1200° F. but after successive regenerations in this manner the catalyst is restored to lower and lower levels of activity until this method of regeneration is no longer satisfactory. An attempt to reactivate such catalysts by first passing air over them at temperatures within the 900°–1200° F. range followed by retreatment with sodium hydroxide solution also fails to produce satisfactory results. According to the improved catalyst activity resulting from contacting fresh catalysts comprising sodium or potassium chromate or dichromate on alumina with sodium hydroxide solution, it would be expected that retreatment with sodium hydroxide solution would reactivate the catalyst, especially since some sodium is probably lost during use by sublimation as sodium oxide, but it was found that treatment of deactivated catalyst with aqueous caustic solution actually resulted in decreased catalyst activity as evidenced by lower benzene yields.

We have now discovered a process for the treatment of deactivated catalysts comprising a chromate or dichromate supported upon alumina to produce reactivated catalysts having sodium or potassium in the catalyst which is preferably in a concentration higher than the stoichiometric equivalent of the chromate or dichromate. The process of this invention can be employed to reactivate a catalyst which already has a ratio of sodium or potassium to chromium at least as great or greater than the stoichiometric ratio whereby the ratio is at least somewhat increased or it can be employed to reactivate a catalyst which does not have a stoichiometric excess of sodium or potassium to chromium whereby the reactivated catalyst does possess a stoichiometric excess of sodium or potassium to chromium. In accordance with our invention a catalyst comprising a compound selected from the group consisting of chromates and dichromates supported upon alumina which has become deactivated by use in an aromatization process is regenerated by contacting the catalyst with an oxygen containing gas at a temperature and for a time duration sufficient to substantially completely remove carbon deposits from the catalyst, cooling and contacting the catalyst with a solution of the hydroxide of a metal from the group consisting of sodium and potassium in which is dissolved a compound selected from the group consisting of chromates and dichromates, the quantity of compound selected from the group consisting of chromates and dichromates in said solution being such that the chromium content of the catalyst remains substantially unchanged, for a time duration sufficiently great to accomplish an increased content in the catalyst of a metal selected from the group consisting of sodium and potassium without appreciable increase or decrease of chromium in the catalyst, removing the solution from the catalyst and drying the catalyst. Preferably, the solution remains in contact with the catalyst for a time duration such that the reactivated catalyst contains a ratio of sodium or potassium to chromium greater than the stoichiometric ratio. Generally, the solution-catalyst contact time required will be 0.1 to 6 hours.

Although the treatment of freshly prepared, non-deactivated catalysts comprising chromates or dichromates of sodium impregnated upon alumina with aqueous sodium or potassium hydroxide solution of moderate concentration results in a substantial improvement in catalyst activity and efficiency, we have discovered that after a catalyst selected from the group consisting of chromates and dichromates of sodium and potassium supported upon alumina has been onstream in a process for the aromatization of paraffins or olefins for an extended period, for example, for more than a throughput interval of about 50 to 100 volumes of hydrocarbon charge per volume of catalyst, treatment with aqueous sodium or potassium hydroxide solution of a concentration similar to that employed in the treatment of the catalyst before use results in a substantial loss in catalyst activity. Although the reason for the contrasting response between the fresh and deactivated catalyst to treatment with sodium or potassium hydroxide solution is not known with certainty, it may be that the catalyst undergoes a change during use. One explanation is as follows. The catalytically active valence states of chromium are the valence states about plus 3. The especially active valence state is plus 6 and this is the form in which it exists upon a freshly prepared catalyst. This valence state is quite soluble in aqueous caustic solution but because there is a large excess on the catalyst of chromium in this valance state, the beneficial effect of caustic treatment of a freshly prepared catalyst more than offsets the effect of leaching of chromium. On the other hand, after the catalyst has been onstream for a period of time under reducing conditions, a substantial proportion of the chromium present becomes reduced to the plus 3 valence state. This valence state is both comparatively catalytically inactive and comparatively insoluble in aqueous caustic as compared to the plus 6 state. Therefore, upon treatment of a used catalyst with caustic, the relatively small proportion of the catalytically active plus 6 valence chromium remaining, being the most soluble form, is selectively leached leaving behind the insoluble catalytically inactive form. Therefore, in caustic treatment of a deactivated catalyst the loss of chromium due to leaching is more detrimental than the beneficial effect due to caustic treatment.

We have now discovered that treatment of a deactivated catalyst with aqueous sodium or potassium hydroxide solution can be caused to effect a substantial reactivation of the catalyst when the sodium or potassium hydroxide solution which is employed contains a quantity of a chromate or dichromate compound which is large enough to prevent leaching of chromium from the catalyst but not sufficiently large to permit deposition of additional chromium upon the catalyst during the regeneration procedure. It is important that the amount of chromium in the sodium or potassium hydroxide regenerating solution be sufficiently large to avoid leaching of chromium from the catalyst in order to prevent deactivation of the catalyst and to prevent waste of catalyst metal. It is also important that the amount of chromate or dichromate in the sodium or potassium hydroxide regenerating solution not be sufficiently great so that deposition of additional chromium upon the catalyst occurs since this would result in changing the nature of the catalyst and also present the likelihood that the stoichiometric balance in favor of excess sodium or potassium over chromate or dichromate upon the catalyst be either reduced or reversed. We have found that good results are achieved when the sodium or potassium hydroxide regenerating solution contains about 12.5 percent by weight of chromate or dichromate either as a sodium or potassium salt or in another form. The amount of chromate in the regenerating solution is between 5 and 25 weight percent generally and preferably between 10 and 15 weight percent. The concentration of sodium or potassium hydroxide in the regenerating solution is between 0.1 and 10 weight percent generally and preferably between 1 and 5 weight percent.

The catalyst composites which are regenerated in accordance with this invention can be dried at a low temperature of 200° to 350° F. and used directly in the aromatization process. It is preferred however to stabilize the catalyst after the low temperature drying by heating to approximately the temperature at which the aromatization reaction takes place, for example, a temperature of 1000° F. The catalyst is heated in the presence of an oxygen containing gas such as air. Further stabilization of the catalyst can be accomplished by heating at 1000° F. in an atmosphere of hydrogen to simulate in part the atmosphere existing in the aromatization process.

Prior to reactivation of a catalyst by sodium or potassium hydroxide treatment, coke which is produced during the aromatization reaction and is deposited on the catalyst is removed. The removal of coke is accomplished in the usual manner by oxidation of the carbonaceous deposits by passing an oxygen containing gas such as air in contact with the used catalyst at a temperature sufficiently high to cause ignition of the deposits. A temperature in the range of 900° to 1200° F. is employed for this ignition.

The catalysts which are regenerated in accordance with this invention are employed in the aromatization of normal and branched paraffins and olefins of at least 6 carbon atoms. The catalysts are also effective for the aromatization of naphthenes having six or more carbon atoms in the naphthene ring. Naphthenes such as methyl cyclopentane having rings of five carbon atoms produce excessive amounts of coke in the aromatization reaction and preferably are removed from the charge stock. The charge stock can be substantially pure streams for the preparation of specific aromatic compounds. Examples are the aromatization of normal hexane or a fraction comprising a mixture of hydrocarbons of six carbon atoms to produce benzene, or the aromatization of heptane to produce toluene. A charge stock for the aromatization reaction can also consist of mixtures of hydrocarbons having hydrogen to carbon ratios higher than those of aromatic compounds, such as hydrocarbons boiling in the gasoline range to produce a mixture of different aromatic hydrocarbons.

The aromatization is accomplished by passing the charge stock over the catalyst at a temperature of 900° to 1100° F., and preferably 950° to 1050° F. The pressure at which the aromatization reaction is carried out should be low since higher pressures reduce the yield of aromatic compounds. Substantially atmospheric pressures, for example, pressures below about 10 pounds per square inch gauge are desirable. A low effective pressure may be obtained by the addition of diluents such as hydrogen to the reactant stream.

The charge stock is passed through the reactor at a liquid hourly space velocity in the range of 0.1 to 10 volumes of charge stock per volume of catalyst per hour and preferably in the range of 0.5 to 2.5 volumes of charge stock per volume of catalyst per hour. Higher selectivities are obtained at space velocities in the upper portion of the range; however, the lower conversions obtained at the higher space velocities result in a low yield of aromatics. The high space velocities can be employed in a process in which unconverted, non-aromatic hydrocarbons are separated from the aromatic reaction products and recycled through the reactor to improve the yield of aromatic hydrocarbons.

EXAMPLE 1

Tests were conducted to illustrate the superiority of a catalyst comprising a chromate or dichromate supported upon alumina which its treated with an aqueous caustic solution as compared to a similar catalyst which has not been treated with an aqueous caustic solution. In preparing the catalysts employed in these tests, ⅜ inch tableted adsorbent alumina containing 5.6 weight percent silica and designated as Harshaw H-42 were broken up and screened to 4-8 mesh size and calcined at 1005° F. for 8 hours. Impregnation solution was prepared by dissolving 1508 grams of Mallinckrodt chromium nitrate, $Cr(NO_3)_3 \cdot 9H_2O$, in a mimimum of distilled water at 118° F. to give 1800 grams (1188 cubic centimeters) of solution. 854 grams (1200 cubic centimeters) of the alumina support were then evacuated in a round bottom flask for one hour and covered with the impregnating solution. The solution remained in contact with the support at the resulting pressure (30 millimeters Hg) for 5 minutes after which the pressure was raised to atmospheric and the mixture allowed to set for 10 additional minutes. The mass was then filtered and the solid oven dried at 258° F. for 24 hours and calcined at 998° F. for 16 hours. The catalyst contained 7.84 percent by weight of chromium.

EXAMPLE 2

A 100 cubic centimeter portion of the catalyst prepared in Example 1 was tested as is while another 100 cubic centimeter portion of this catalyst was soaked for 3 hours in a 300 cubic centimeter aqueous solution containing 2.5 percent by weight of sodium hydroxide. The solution was drained from the composite and the composite was dried in an oven, heated at 1022° F. in the presence of air from 2½ hours, flushed with nitrogen, and treated with hydrogen at 1022° F. for 2 hours. This catalyst contained 5.53 weight percent of chromium and 1.68 weight percent of sodium.

The catalyst of Example 1 and the catalyst of Example 2 were tested separately with similar charge stocks under similar treating conditions. In each case a n-hexane charge stock was passed over the catalyst at a space velocity of 1 liquid volume of charge per volume of catalyst, a fresh hydrogen rate of 1500 standard cubic feet per barrel of feed, a temperature of 1022° F. and at atmospheric pressure until a throughput of 4 volumes of charge per volume of catalyst was reached. The results of the aromatization of n-hexane with each catalyst is shown in Table 1.

Table 1

| Example | 1 | 2 |
|---|---|---|
| Products: | | |
| Dry Gas, Weight Percent | 11.52 | 10.74 |
| Liquid, Weight Percent | 82.46 | 88.67 |
| Coke, Weight Percent | 3.86 | 0.41 |
| Loss, Weight Percent | 2.16 | 0.18 |
| Benzene Selectivity, Mole Percent | 40 | 63 |
| Conversion, Mole Percent | 51 | 58 |
| Benzene Yield, Weight Percent | 18 | 33 |

As shown in Table 1 the catalyst treated with sodium hydroxide solution is highly superior.

EXAMPLE 3

The test employing the catalyst of Example 2 was continued and after each throughput interval of 4 volumes of charge per volume of catalyst the catalyst was regenerated by heating in a slow stream of air at 1022° F. for 16 hours, flushed with nitrogen to remove traces of oxygen and treated with hydrogen at 1022° F. for 1 hour. The product recovered during the throughput interval of 20 to 24 volumes of hydrocarbon per volume of catalyst was recovered and analyzed. The results are shown in Table 2.

EXAMPLE 4

The test described in Example 3 was continued and the catalyst was regenerated in air as described in Example 3 after each throughput interval of 4 volumes hydrocarbon throughput per volume of catalyst. The product recovered during the throughput interval 80 to 84 was recovered and analyzed. The results of this analysis are shown in Table 2.

EXAMPLE 5

The test described in Example 4 was continued with the catalyst regenerated as described after each throughput interval of 4 volumes of hydrocarbon per volume of catalyst. After 104 volumes of hydrocarbon per volume of catalyst had passed through the reactor the catalyst was regenerated by heating in air in the manner described and was additionally treated by soaking in 300 cubic centimeters of aqueous caustic solution containing 2.5 weight percent sodium hydroxide for 3 hours. The caustic solution was then drained from the composite and the composite was dried for 16 hours in air at 212° F., then calcined about 2 hours in an air stream at 1020° F. after which the catalyst was reduced in hydrogen for 3 hours at 1020° F. The products obtained during the throughput interval 104 to 108 were cooled and analyzed. The results are shown in Table 2.

EXAMPLE 6

The catalyst of Example 5 was regenerated by heating in air in the manner described previously. Thereupon it was treated by soaking for 3 hours in 285 cubic centimeters of aqueous solution containing 2.5 weight percent sodium hydroxide and 12.5 weight percent sodium chromate. The catalyst was then dried, calcined and reduced in hydrogen as in Example 5. The products obtained during the throughput interval 108 to 112 were cooled and analyzed. The results are shown in Table 2.

Table 2

| Example | 2 | 3 | 4 | 5 | 6 |
|---|---|---|---|---|---|
| Catalyst | Fresh chromium on alumina treated with sodium hydroxide. | Same. Regenerated by heating in air. | Same. Regenerated by heating in air. | Same. Regenerated by heating in air. Sodium hydroxide retreated. | Same. Regenerated by heating in air. Sodium hydroxide plus sodium chromate retreated. |
| Throughout interval during which sample was taken, Volumes hydrocarbon per volume of catalyst. | 0–4 | 20–24 | 80–84 | 104–108 | 108–112. |
| Product: | | | | | |
| Dry Gas, Weight Percent | 10.7 | 9.3 | 8.5 | 7.7 | 9.2. |
| Liquid, Weight Percent | 88.7 | 89.9 | 90.8 | 91.7 | 91.1. |
| Coke, Weight Percent | 0.4 | 0.1 | 0.1 | 0.1 | 0.4. |
| Loss, Weight Percent | 0.2 | 0.7 | 0.7 | 0.5 | minus 0.7. |
| Benzene Selectivity, Mole Percent | 63 | 54 | 45 | 45 | 64. |
| Conversion, Mole Percent | 58 | 45 | 35 | 24 | 41. |
| Benzene Yield, Weight Percent | 33 | 22 | 14 | 10 | 24. |

As shown in Table 2 catalyst regeneration by heating in air alone or by heating in air followed by sodium hydroxide retreatment were ineffective. However, catalyst regeneration by retreatment with a solution containing 12.5 weight percent sodium chromate together with 2.5 weight percent sodium hydroxide was highly beneficial.

Additional tests were conducted to illustrate the effect of chromate concentration in the caustic solution. These tests were made by contacting aqueous caustic solutions containing 2.5 weight percent sodium hydroxide together with varying amounts of either sodium chromate or ammonium chromate with a composition comprising 8 weight percent chromium on Harshaw H–42 alumina. The tests were made to determine for each concentration of chromate in the solution upon filtering out the catalyst after treatment by soaking for 3 hours. The results of these tests are shown in Table 3.

Table 3

| Concentration of chromate, weight percent, in 2.5 weight percent aqueous NaOH solution | Change of amount of chromate in filtrate from that in treating solution, weight percent | |
|---|---|---|
| | Chromate present as ammonium chromate | Chromate present as sodium chromate |
| 1.8 | | 98 |
| 2.6 | 62 | |
| 3.4 | | 45 |
| 4.9 | 20.0 | |
| 6.7 | | 16 |
| 9.4 | 0.3 | |
| 13.0 | | minus 5 |
| 18.2 | minus 0.25 | |

Various changes and modifications may be made without departing from the spirit of this invention and the scope thereof as defined in the following claims.

We claim:

1. In the regeneration of a catalyst comprising a compound selected from the group consisting of chromates and dichromates supported upon alumina, the method comprising burning substantially all carbon deposits from said catalyst, contacting said catalyst with a solution of the hydroxide of a metal from the group consisting of sodium and potassium in which is dissolved a compound selected from the group consisting of chromates and dichromates, the quantity of hydroxide of a metal from the group consisting of sodium and potassium being such that the quantity of metal selected from the group consisting of sodium and potassium upon the catalyst is increased, the quantity of compound selected from the group consisting of chromates and dichromates in said solution being such that the chromium content of the catalyst is substantially unchanged, continuing contacting said catalyst and said solution until there is an increased quantity in the catalyst of metal from the group consisting of sodium and potassium, removing said solution containing a substantially unchanged quantity of compound selected from the group consisting of chromates and dichromates from said catalyst and drying said catalyst.

2. The method of claim 1 wherein the contact time of said catalyst and said solution is 0.1 to 6 hours.

3. In a process for the regeneration of a catalyst comprising a metal compound selected from the group consisting of chromates and dichromates supported upon alumina, said metal being selected from the group consisting of sodium and potassium, to yield a regenerated catalyst containing metal selected from the group consisting of sodium and potassium in greater than stoichiometric proportion, the method compirsing burning substantially all carbon deposits from said catalyst, contacting said catalyst with a solution of the hydroxide of a metal from the group consisting of sodium and potassium in which is dissolved a compound selected from the group consisting of chromates and dichromates, the quantity of hydroxide of metal from the group consisting of sodium and potassium being such that the quantity of metal selected from the group consisting of sodium and potassium upon the catalyst is increased, the quantity of compound selected from the group consisting of chromates and dichromates in said solution being such that the chromium content of the catalyst remains substantially unchanged, continuing contacting said catalyst and said solution until the quantity of metal from the group consisting of sodium and potassium in said catalyst is increased to more than stoichiometric proportion, removing said solution containing a substantially unchanged quantity of compound selected from the group consisting of chromates and dichromates from said catalyst and drying said catalyst.

4. In the regeneration of a catalyst comprising a compound selected from the group consisting of chromates and dichromates supported upon alumina, the method comprising burning substantially all carbon deposits from said catalyst, contacting said catalyst with a solution of the hydroxide of a metal selected from the group consisting of sodium and potassium in which is dissolved a compound selected from the group consisting of chromates and dichromates, the quantity of hydroxide of a metal from the group consisting of sodium and potassium in said solution being such that the quantity of metal selected from the group consisting of sodium and potassium upon the catalyst is increased, the quantity of compound selected from the group consisting of chromates and dichromates comprising an amount between 5 and 25 weight percent of said solution such that the chromium content of the catalyst remains substantially unchanged, continuing contacting said catalyst and said solution until there is an increased quantity in the catalyst of metal from the group consisting of sodium and potassium, removing said solution containing a substantially unchanged quantity of compound selected from the group consisting of chromates and dichromates from said catalyst and drying said catalyst.

5. In the regeneration of a catalyst comprising a sodium compound selected from the group consisting of chromates and dichromates supported upon alumina, the method comprising burning substantially all carbon deposits from said catalyst, contacting said catalyst with an aqueous sodium hydroxide solution in which is dissolved a compound selected from the group consisting of chromates and dichromates, the quantity of compound from the group consisting of chromates and dichromates in said solution comprising an amount between 5 and 25 weight percent of said solution such that the chromium content of the catalyst remains substantially unchanged, the amount of sodium hydroxide in said solution being between 0.1 and 10 weight percent, continuing contacting said catalyst and said solution until there is an increased quantity of sodium in the catalyst, removing said solution containing a substantially unchanged quantity of compound selected from the group consisting of chromates and dichromates from said catalyst and drying said catalyst.

6. In the regeneration of a catalyst comprising a sodium compound selected from the group consisting of chromates and dichromates supported upon alumina, the method comprising burning substantially all carbon deposits from said catalyst, contacting said catalyst with an aqueous sodium hydroxide solution in which is dissolved a compound selected from the group consisting of chromates and dichromates, the quantity of compound from the group consisting of chromates and dichromates in said solution comprising an amount between 10 and 15 weight percent of said solution such that the chromium content of the catalyst remains substantially unchanged, the amount of sodium hydroxide in said solution being between 0.1 and 5 weight percent, continuing contacting said catalyst and said solution until there is an increased quantity in the catalyst of sodium, removing said solution containing a substantially unchanged quantity of compound selected from the group consisting of chromates and dichromates from said catalyst and drying said catalyst.

7. In a process for regenerating a catalyst comprising a sodium compound selected from the group consisting of chromates and dichromates supported upon alumina, the method comprising burning substantially all carbon deposits from said catalyst, contacting said catalyst with an aqueous sodium hydroxide solution in which is dissolved an ammonium compound selected from the group consisting of chromates and dichromates, the quantity of compound from the group consisting of chromates and dichromates in said solution comprising an amount between 5 and 25 weight percent of said solution such that the chromium content of the catalyst remains substantially unchanged, the amount of sodium hydroxide in said solution being between 0.1 and 10 weight percent, continuing contacting said catalyst and said solution until there is an increased quantity of sodium in the catalyst, removing said solution containing a substantially unchanged quantity of compound selected from the group consisting of chromates and dichromates from said catalyst and drying said catalyst.

References Cited in the file of this patent
UNITED STATES PATENTS
2,605,235    Pitzer _____ July 29, 1952

UNITED STATES PATENT OFFICE
CERTIFICATE OF CORRECTION

Patent No. 3,044,963                                      July 17, 1962

Russell G. Hay et al.

It is hereby certified that error appears in the above numbered patent requiring correction and that the said Letters Patent should read as corrected below.

Column 6, line 51, after "the", first occurrence, insert -- caustic solution the change of amount of chromate in the --.

Signed and sealed this 20th day of November 1962.

(SEAL)
Attest:

ERNEST W. SWIDER                                        DAVID L. LADD
Attesting Officer                                            Commissioner of Patents